Feb. 3, 1970 G. RAINERO 3,492,871

MERCURY COLUMN PRESSURE GAUGES

Filed Feb. 20, 1968

United States Patent Office 3,492,871
Patented Feb. 3, 1970

3,492,871
MERCURY COLUMN PRESSURE GAUGES
Giovanni Rainero, Via Edmondo de Amicis 74,
Collegno, Turin, Italy
Filed Feb. 20, 1968, Ser. No. 706,930
Claims priority, application Italy, Feb. 25, 1967,
50,687/67
Int. Cl. G01l 7/18
U.S. Cl. 73—401                                                5 Claims

ABSTRACT OF THE DISCLOSURE

The gauge tube of a mercury column pressure gauge communicates at a point below its closed upper end with atmosphere through a valve which is controlled by the height of the mercury column in the tube, the valve being open and closed according as the mercury column is respectively below or above a given height.

---

Figure 1:
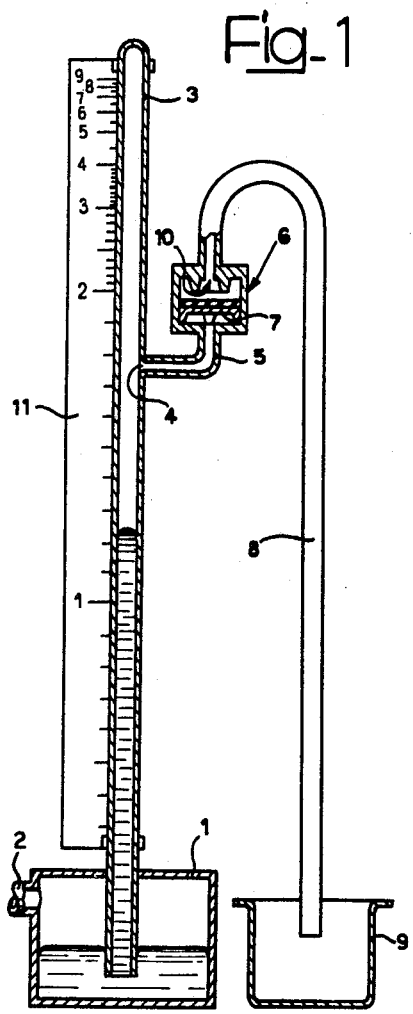

The invention relates to mercury column pressure gauges, for measuring, for example, tyre pressures in motor vehicles, such gauges being commonly provided at filling stations.

In known mercury column pressure gauges of the so-called "free air" type, a gauge tube containing a mercury column communicates permanently at its upper end with the atmosphere, the displacement of the mercury column being accurately proportional to the pressure to be measured. Such gauges are well suited to the measurement of relatively low pressures (up to about two atmospheres), such as are used in conventional motor car tyres.

For high performance motor cars and commercial vehicles, however, higher tyre pressures are commonly employed, and the "free air" type of pressure gauge is unsuitable, since gauge tubes of a length unacceptable in practice would be necessitated. In order to measure such higher tyre pressures in the range of pressures extending from those used in conventional motor car tyres to those used in tyres for high performance cars and commercial vehicles, compressed air mercury column gauges have hitherto been employed, in which the gauge tube is sealed, the mercury column therein trapping a quantity of air. The volume of the trapped air decreases as the mercury column rises upon increase in the pressure to be measured.

Such compressed air mercury column gauges are of small height as compared with their free air counterparts. In compressed air mercury column gauges the air trapped in the gauge tube behaves to a reasonable approximation as a perfect gas as long as the temperature remains substantially constant, inasmuch as it obeys Boyle's law to a close approximation, its volume being inversely proportional to the pressure.

However, such compressed air mercury column gauges, in addition to being less accurate than free air gauges, are easily affected by variations in temperature and are, moreover, open to the objection that their calibration is logarithmic, as contrasted with the linear calibration of free air mercury column gauges. In order to minimise coarse errors due to changing ambient conditions, compressed air mercury column gauges are arranged so that in use thereof the air is trapped by the mercury in the gauge tube just a few moments before any measurement.

Inaccuracy of compressed air mercury column gauges is more marked within the low pressure ranges, in which even a small error due to changes in the ambient conditions is reflected as a high percentage error in the measured value of the pressure, whereas in the higher pressure range the same error hardly affects the measurement.

An object of the invention is to provide a mercury column pressure gauge, suitable for measuring motor vehicle tyre pressures, which operates in measuring low pressures like a free air gauge and in measuring high pressures like a compressed air mercury column gauge.

With the above objects in view the invention provides a mercury column pressure gauge in which mercury is displaced in a substantially vertical gauge tube in dependence on a pressure to be measured, the tube being closed at its upper end, characterised in that the gauge tube communicates below its upper end with the atmosphere through valve means which are controlled automatically in response to the mercury level in the gauge tube so that said valve means are open when the mercury level in the tube is below a given height and are closed, completely sealing the tube, when said mercury level exceeds said height.

Figure 2:
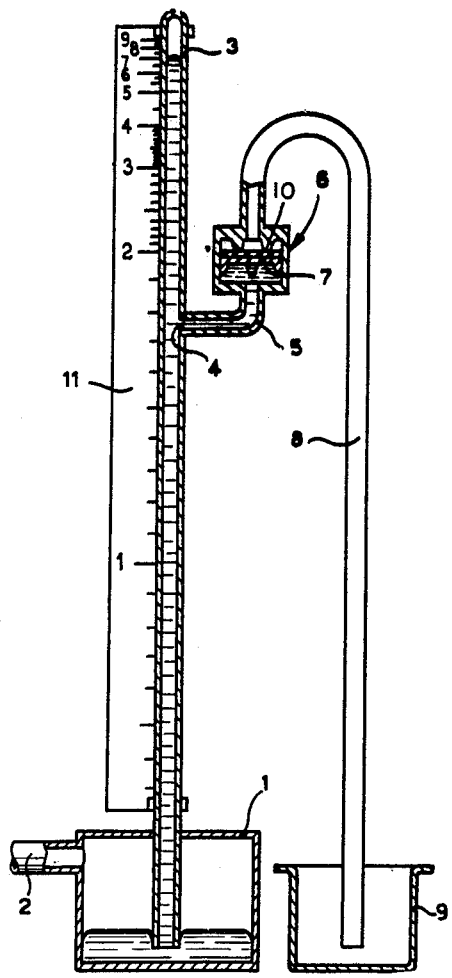

The invention will be more clearly understood from the following description, given by way of example only, with reference to the accompanying drawings, in which:

FIGURES 1 and 2 are schematic side sectional elevation views which diagrammatically a mercury column pressure gauge according to one embodiment of the invention, in two different operating conditions for low pressure and high pressure measurement respectively.

The gauge is adapted to measure tyre pressures on motor vehicles and comprises a sealed chamber 1 partly filled with mercury. The top of the chamber 1 connects through a conduit 2 with an appliance of the pistol-grip type (not shown) for inflating tyres and checking the tyre pressures attained, such as is commonly provided at a petrol filling station. Such an appliance is of the three-way type, as is well known, a first way communicating with a compressed air source, a second way communicating with a fitting connectable with a tyre inflating valve, and a third way communicating with the top of the chamber 1 through the conduit 2.

The pistol-grip appliance is provided with a hand-operated control member which, depending on the position it occupies, selectively connects the tyre inflating valve with the compressed air source and simultaneously interrupts the communication with the compressed air source. In the latter position of the control member the pressure in the chamber 1 is the same as the pressure in the tyre. The pressure in the chamber 1 is measured by the height of a mercury column in a gauge tube 3.

The gauge tube 3 communicates with the chamber 1, the gauge tube 3 extending vertically and having an open lower end which is immersed in the mercury in the chamber 1. The gauge tube 3 is closed at its upper end and has an opening 4 in its well below said upper end. The opening 4 opens into a branch conduit 5 which communicates with atmosphere through a valve having a valve chamber 6 and a float valve member 7 displaceably mounted therein.

The valve chamber 6 is connected with the atmosphere through a downwardly extending tube 8 which terminates in an open container 9 and which forms therewith a trap for any mercury droplets which leak past the valve member 7.

A valve seat 10 co-operating with the the valve member 7 lies substantially at the same level as the opening 4; this is not shown in the drawings, in which, for the sake of clarity, the valve is shown on an enlarged scale compared with the gauge tube 3.

When the mercury level in the gauge tube 3 is lower than the opening 4 and hence lower than the valve seat 10, the arrangement operates as a free air gauge (FIGURE 1), the difference in level between the free mercury surface in the chamber 1 and the top of the meniscus of the mercury column in the gauge tube 3 being a direct measure of the pressure prevailing in the chamber.

When the mercury column level in the gauge tube 3 rises beyond the level of the opening 4, the valve member 7 rises into sealing engagement with the valve seat 10 and closes the valve, effectively sealing the gauge tube 3 from the atmosphere, so that the arrangement then operates as a compressed air mercury column gauge (FIGURE 2). The pressure in the chamber 1 then equals the pressure due to the height of the merucry column increased by the pressure of the air trapped in the upper portion of the gauge tube 3 by the mercury column.

As the mercury column sinks below the level of the valve seat 10, the valve re-opens and re-establishes communication between the gauge tube 3 and the atmosphere through the opening 4.

The level of the opening 4, and, in the illustrated embodiment, of the valve seat 10 is selected so as to subdivide the total range of measured pressures into a low pressure and a high pressure range respectively. In the embodiment shown this level corresponds to a measured pressure of two atmospheres so that the total range of operation of the gauge covers the pressure range adopted by most motor vehicles tyres.

The pressure gauge tube 3 is provided with a scale 11 graduated in atmospheres; this scale is linear in its lower part up the opening 4 and is logarithmic in its remaining part corresponding to higher pressures (i.e. above two atmospheres), as required by Boyle's law.

Various details of the construction described above may be varied without departing from the scope of the invention. For example, other forms of valve may be used in place of the float valve of the illustrated embodiment. Thus an electromagnetically operated valve could, for example, be employed, in which case the mercury column in the gauge tube 3 could complete an energising circuit for the valve when the mercury level in the tube 3 reached a given height, for example, the height of the opening 4. In any case, closure and opening of the valve is automatically controlled by the displacement of the mercury column in the gauge tube 3.

It will be noted that in practical use of the pressure gauge herein described the air in the gauge tube 3 is trapped for measuring high pressures immediately before the measurement takes place, as required for accurate operation of compressed air mercury column gauges.

I claim:
1. A mercury column pressure gauge including a substantially vertical gauge tube having a closed upper end, means effecting displacement of mercury in said tube in dependence on a pressure to be measured, valve means connected to the tube below its upper end, said valve means communicating with atmosphere, and means controlling opening and closure of the valve means automatically in response to the mercury level in the gauge tube, whereby said valve means are open when the mercury level in the tube is below a given height and are closed, completely sealing the tube, when said mercury level exceeds said height.

2. Pressure gauge as claimed in claim 1 in which a branch conduit communicates with the gauge tube below the upper end of the latter and the valve means comprise a float valve which is normally open and which is closed by the direct action of the mercury thereon.

3. Pressure gauge as claimed in claim 2 in which the float valve is disposed close to the level at which the branch conduit communicates with the gauge tube.

4. Pressure gauge as claimed in claim 1 including a sealed chamber containing a reservoir of mercury and in which the gauge tube has an open lower end which extends into said reservoir of mercury, and further including means for supplying the pressure to be measured to the said sealed chamber.

5. Pressure gauge as claimed in claim 1 including a mercury trap through which the valve means communicate with atmosphere, said mercury trap being effective to retain any mercury leaking past the valve means.

References Cited

UNITED STATES PATENTS 3,173,298   3/1965   Gilmont _____ 73—401

DONALD O. WOODIEL, Primary Examiner